UNITED STATES PATENT OFFICE.

L. OTTO P. MEYER, OF NEW YORK, N. Y., ASSIGNOR TO CONRAD POPPENHUSEN.

IMPROVEMENT IN TREATING CAOUTCHOUC AND OTHER VULCANIZABLE GUMS.

Specification forming part of Letters Patent No. 10,741, dated April 4, 1854; Reissue No. 797, dated August 16, 1859.

*To all whom it may concern:*

Be it known that I, L. OTTO P. MEYER, of Newtown, in the State of Connecticut, but now residing in Hamburg, Germany, have invented an improved process for obtaining articles of the hard compound of vulcanized india-rubber, gutta-percha, or other vulcanizable gum of any desired form and surface; and I do hereby declare that the following is a full, clear, and exact description thereof.

Prior to my said invention serious difficulties were experienced in obtaining any desired form with any required surface of what is known as the "hard compound of vulcanized india-rubber, gutta-percha, or other vulcanizable gums" on account of the changes induced in the compound by the action of the heat to which it must be subjected to produce what is known as "vulcanization." This compound had been vulcanized in solid metallic molds; but the use of such molds was objectionable and attended with serious difficulties. The metallic molds were very expensive, occupied much room in the heater, and required much labor in handling and great power in applying them so as to insure contact with the surface of the compound while in the plastic state. The molds could not yield to the expansion and contraction of the compound during the vulcanizing process, and although this was not a serious objection, when applied to the production of hollow articles, it was very objectionable when applied to solid articles. It was also difficult to separate the molds from the compound when vulcanized without danger of fracturing the product; and, finally, when articles required were of a very irregular configuration it was difficult to apply the heat uniformly to the entire surface without incurring the additional expense of making the molds of uniform thickness throughout. With the view of avoiding these difficulties and objections this substance was vulcanized sometimes in molds made of plaster-of-paris or other porous substances, at others while enveloped in granular matter or placed on sheets of iron and covered with granular matter; but these methods, although useful for some purposes, were still attended with serious difficulties and failed to produce with the requisite practical certainty the desired surface and shapes required for many purposes in the art. And still another method invented by Charles Goodyear, the author of vulcanization, was to pile a series of sheets of the compound while in the green or plastic state with flexible sheets of other substances interposed, and then binding the whole pile between rigid clamping-plates, and in that condition subjecting the whole to the heating process; but this process presented many of the difficulties experienced in the use of solid metallic molds, and the more serious objection of excluding the heat in a great measure from the central portions of the sheets, and particularly those at the middle of the pile.

In the progress of my experiments in the foregoing state of the art with the view to obtain cheaper, better, and more certian results, I discovered that when the said hard compound of vulcanized gums is covered while in the green or plastic state with some pliable or flexible substance—such as pliable or flexible sheets of metal—so applied as to insure the contact of the covering with the compound, and in that condition and without other means of confinement it is subjected to the vulcanizing heat that the compound will preserve the form previously imparted, whatever that may be, notwithstanding the pliable or flexible property of the covering, and that after the covering is stripped off the surface will correspond with that of the covering, so that the degree of smoothness will depend upon the smoothness of the surface of the covering substance.

In view of the said discovery my said invention for producing articles of the hard compound of india-rubber or other vulcanizable gum of any desired form and with any desired surface consists in the employment of pliable or flexible sheets applied by pressure to the compound while in the green or plastic state to insure the contact of the surface of the covering with the surface of the compound, and while thus covered or envoloped and without other confinement subjecting it to the vulcanizing heat, and after being vulcanized stripping off the covering. The pliable or flexible nature of the covering substance enables it to yield to the pressure, when applied to the plastic compound, so as to insure contact of the surfaces, yields to the expansion and contraction of the compound during the vulcanizing process, so as to preserve the form and surface without violence to the substance produced by the vulcanization, and admits of readily stripping it off without fracturing the product, however brittle, or injuring the surface thereof.

Having thus pointed out what distinguishes my said invention from all other processes before known for producing the hard compound of vulcanizable gums, I will now describe the mode in which I apply my said invention to practice. For this purpose I take sheets of tin, (generally called "tin-foil,") and of a thickness depending upon the form desired to be vulcanized, as will be presently indicated, and I prefer this substance because its pliability or flexibility is well adapted to carry out fully the mode of operation which distinguishes my said invention from all other prior processes applied to this purpose, and because it is not injured by the chemical agents in the compound or evolved during the vulcanizing process, and for the further reason that after having been used it can be readily restored to be used again, and when too much injured it can be melted and remanufactured into sheets of the required thickness. The gum, whether india-rubber or other vulcanizable gum, after being prepared in manner well known to the trade for producing what is known as the "vulcanized hard compound," invented by Nelson Goodyear, is taken in sheets, masses, or pieces suited to the article to be produced and laid between two of the sheets of tin, and by the application of sufficient pressure the surface of the tin is forced into contact with the plastic compound, taking care to insure a perfect contact.

If the articles to be produced are required to be flat sheets of the hard compound, I prefer to roll the compound into sheets of about the required size and thickness, and while in the plastic state I lay each sheet on a sheet of tin and roll it down, and then lay the other sheet of tin over it and roll that on; or I lay the sheet of compound between the two sheets of tin and pass the whole between calender-rollers, and thus force out the interposed air and insure the contact of the entire surface; but if articles of irregular figures are to be produced I prefer to envelope a piece or mass of the plastic compound of the required size in two sheets of tin and place the whole between dies of the required form and stamp or press the whole into the required form, taking care to apply such power as to insure the contact of the tin with the surface of the compound; but it will be obvious that instead of this the compound and the tin can be first brought to the required or approximate form, and then the whole pressed together to effect the contact of the covering-tin with the compound; or if the form to be produced is such as will admit of it, a sheet of the compound may be placed between two sheets of tin, and then passed between rollers so formed as to impart the required configuration, and at the same time insure the required contact of the surfaces.

When the articles to be produced are of such irregularity as to present sharp angles or sudden curvatures and sinuosities, the covering-tin or equivalent should be thinner than when the articles are to be of regular shape to insure the contact with the compound in the sinuosities. For forms presenting only flat or regular faces, I prefer to use sheets of about nineteen gage; but I have used them with success, both thicker and thinner, and the thickness may be varied at the discretion of the operator, so long as it is pliable or flexible to answer the purpose of my invention. I have used sheets of other metal, but have obtained the best and cheapest results with tin, for the reasons above given. The plastic compound thus covered I then subject to the heating process without further care or preparation, preferring, however, to heat it under water in a close vessel raised to the required vulcanizing heat, and for a suitable length of time, as is well known to persons skilled in the production of this substance; and although I prefer the use of tin as being in my judgement the best adapted to the full development of the advantages of the mode of operation invented by me, nevertheless I do not wish to be understood as limiting my claim of invention to the use of sheets of tin, as other substances having equivalent properties to those which exist in sheet-tin, and which are brought into action in my process, and differing only in degree of excellence, may be substituted to work out my said mode of operation and produce the same result in kind.

I do not wish to be understood as making claim to the process of vulcanizing india-rubber or allied gums by subjecting the compound of any of the said gums with sulphur, &c., to a high degree of heat for producing either the soft or the hard compound, as the invention of the said Meyer merely relates to the use of tin-foil or other equivalent flexible substance during the vulcanizing process as a means of retaining the shapes or forms and protecting the surface of the compound during the process of vulcanization.

What I claim as my invention, and desire to secure by Letters Patent, is—

The mode of operation or mode of procedure, substantially such as herein described, which said mode of operation consists in the employment of a pliable or flexible envelope, substantially such as herein described, or the equivalent thereof, applied by pressure to the hard compound of vulcanizable gum, while in the green or plastic state, so as to insure the contact of such covering with the surface of the compound, and while thus covered or protected, subjecting it to the vulcanizing heat, and when vulcanized stripping off such covering, the whole process being substantially such as specified.

Hamburg, March 7, 1859.

L. OTTO P. MEYER. [L. S.]

In presence of—

JOHN B. MILLER,
C. MEYER.